Feb. 24, 1953  M. L. BROWN  2,629,527
CARRIER
Filed June 7, 1950  2 SHEETS—SHEET 1

Martin L. Brown
INVENTOR.

BY Clarence A. O'Brien
and Harvey B. Jacobson
Attorneys

Feb. 24, 1953  M. L. BROWN  2,629,527
CARRIER
Filed June 7, 1950  2 SHEETS—SHEET 2

Martin L. Brown
INVENTOR.

BY Clarence A. O'Brien
and Harvey B. Jacobson
Attorneys

Patented Feb. 24, 1953

2,629,527

UNITED STATES PATENT OFFICE 2,629,527

CARRIER

Martin L. Brown, Shreveport, La.

Application June 7, 1950, Serial No. 166,636

5 Claims. (Cl. 224—32)

This invention comprises novel and useful improvements in a carrier and more specifically pertains to a luggage carrier for motorcycles and particularly for motorcycles of the type known as motor scooters.

The principal object of this invention is to provide an improved construction of luggage carrier and one which is specifically adapted for convenient and advantageous mounting in a highly improved manner upon a conventional form of motorcycle known as a motor scooter.

A further object of the invention is to provide an improved luggage carrier generally adapted for mounting upon motorcycles and which shall be of an exceedingly strong and sturdy construction, yet of relatively light weight, which shall be economical to manufacture and may be readily installed or removed from a motorcycle.

And a still further important object of the invention is to provide an improved luggage carrier specifically adapted for mounting upon the rear portions of motorcycles of the so-called motor scooter type wherein the luggage carrier shall be securely attached to various portions of the specific motorcycle construction.

These, together with various ancillary features and objects of the invention which will later become apparent as the following description proceeds, are attained by the present invention, a preferred embodiment of which has been illustrated, by way of example only, in the accompanying drawings, wherein.

Figure 1:
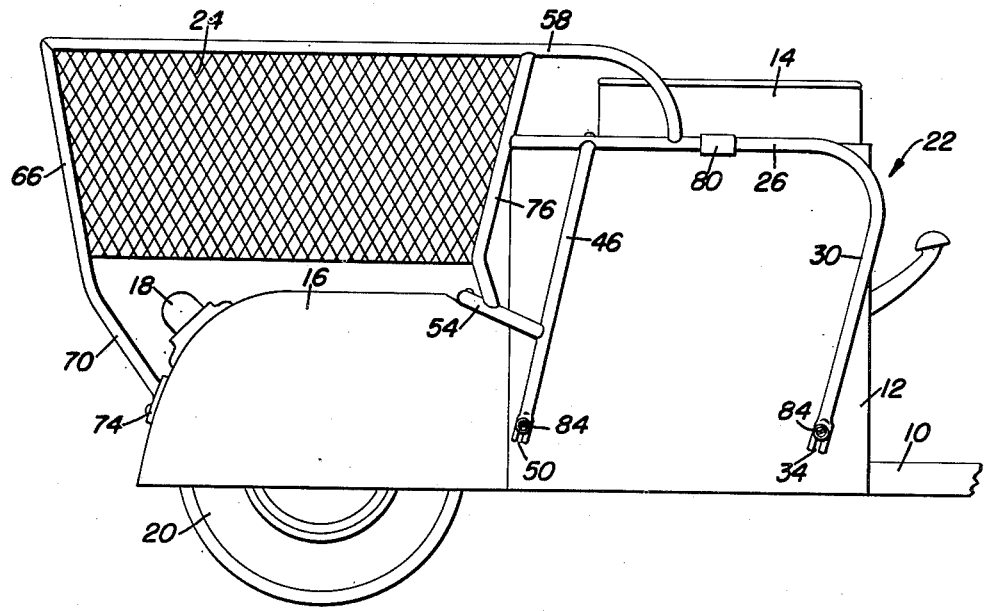
Figure 1 is a side elevational view showing a portion of a motorcycle of the motor scooter type having a luggage carrier embodying therein the principle of this invention being mounted thereon.

There have been recent and popular developments in the motorcycle field of an improved and inexpensive vehicle known as a motor scooter, one such type with which the present invention is specifically adapted for application, being the well known "Cushman motor scooter." This conventional form of motor scooter or motorcycle, insofar as the same has been illustrated in the drawings, includes a platform 10 upon which the feet of the driver or rider are adapted to rest, together with a housing 12 which encases the customary internal combustion engine, not shown, forming the power source of the scooter, the top portion of this housing containing a gas tank, not shown, upon the upper surface of which is adapted to be mounted a seat 14 to be occupied by the rider. Rearwardly of the motor housing 12 the scooter is provided with a rear fender 16 upon which is mounted the customary tail light 18 and within which is housed the rear supporting and driving wheel 20.

Although the luggage carrier forming the subject of this invention is in many of its principles and features applicable to various other types of motorcycles, the same has been indicated as applied specifically to a motor scooter of the type hereinbefore referred to in order to clearly depict the manner in which the principles of the invention are specifically applied to a specific and conventional form or known type of motorcycle.

The luggage carrier whose novel construction incorporates the basic and essential features of this invention, includes a supporting frame, indicated generally by the numeral 22, and which includes front and rear mounting assemblies of a construction hereinafter set forth in greater detail, by means of which is supported a luggage holder which may conveniently take the form of a basket 24 which may be of any desired material, shape and size, and as illustrated may conveniently and satisfactorily be fabricated from a sheet or sheets of expanded metal.

Figure 4:
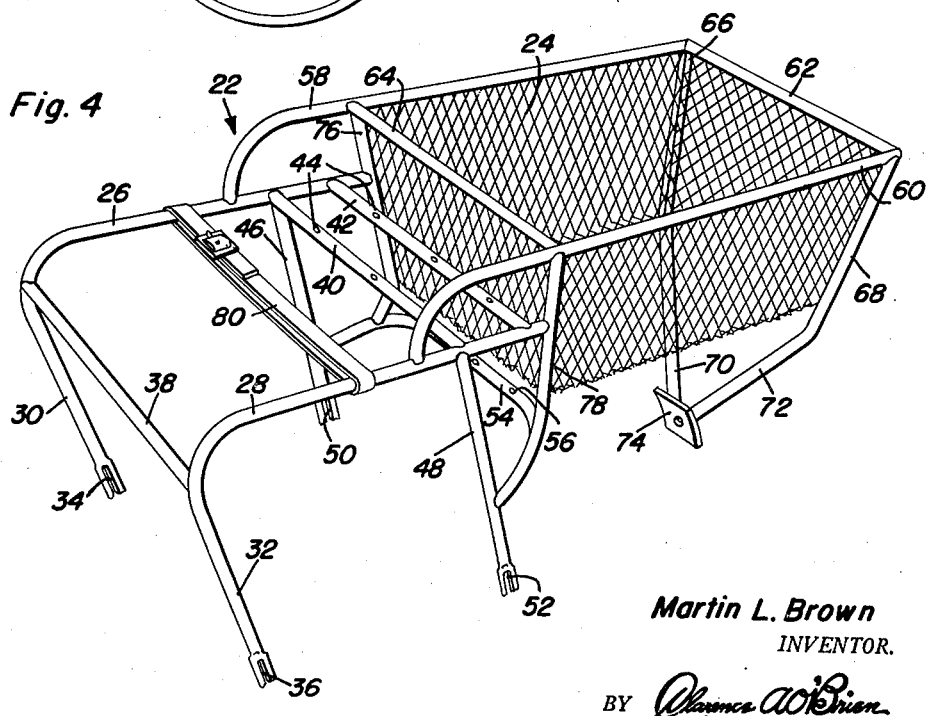
Figure 4 is a perspective view of the improved luggage carrier specifically adapted for use with a motorcycle of the motor scooter type.

Referring now more specifically to Figure 4 it will be seen that the supporting frame includes a pair of substantially parallel, horizontally disposed and forwardly extending side members 26 and 28 which at their forward ends are curved and extend downwardly and rearwardly to provide the pair of depending legs 30 and 32 which are bifurcated as at 34 and 36 at their lower ends. The forward portions of the side members 26 and 28 are rigidly connected together and braced for greater rigidity by a laterally disposed bar 38.

Figure 3:
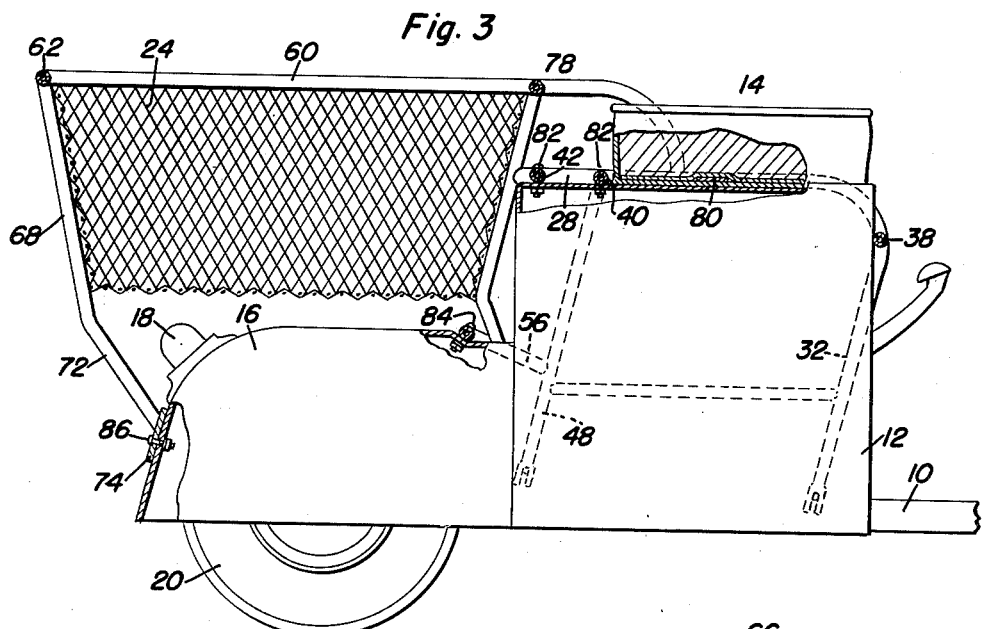
Figure 3 is a vertical longitudinal sectional view taken substantially on a plane indicated by the section line 3—3 of Figure 2, parts being broken away and shown in sections.

Adjacent their rear ends, the side members 26 and 28 are provided with a pair of parallel transverse reinforcing bars 40 and 42 which are provided with suitable apertures 44 for a purpose which will be later set forth. Adjacent their rearward ends, and positioned substantially at the ends of the transverse bar 48, the side members 26 and 28 are provided with depending legs 46 and 48 which at their lower ends are bifurcated as at 50 and 52, these legs being inclined slightly rearwardly as will be apparent from Figures 1 and 3.

The supporting frame further includes a substantially horizontally disposed and backwardly curved transverse bar 54 whose extremities are connected to the above mentioned legs 46 and 48, which bar is provided with apertures 56 for a purpose which will be later set forth.

The supporting frame further includes upper side rails 58 and 60 which at their forward ends are curved downward for rigid attachment to the side rails 26 and 28 intermediate the ends of the latter, the upper rails extending substantially horizontally and rearwardly, and at their rear ends are joined by a transverse bar 62. Between the front portions of the side rails 58 and 60, is a forward transverse bar 64 which in conjunction with the bar 62 thus defines a rectangular horizontally disposed supporting frame to which the upper edges of the side walls of the expanded metal basket 24 are fixedly secured in any desired manner.

A rear mounting assembly is rigidly secured to the rear ends of the upper side members 58 and 60 and the rear transverse bar 62, the same comprising a pair of depending members 66 and 68 whose lower portions are angulated and converge toward each other as at 70 and 72, and are fixedly secured to a mounting bracket or plate 74.

At the front portion of the basket 24 there are provided a pair of frame members 76 and 78 whose upper ends are attached to the upper side members 58 and 60 adjacent the connection of the front transverse rod 64 therewith, and its lower extremities are attached to the reinforcing bar 54.

It should be here understood that the various elements making up the supporting frame as well as the basket 24 can be formed of any desired material and assembled in any desired manner; but it is preferred in the interest of economy, lightness of weight and durability to form the supporting frame of tubular rods and to weld or otherwise rigidly secure the same together; while the luggage holder or basket 24 may satisfactorily be formed of expanded metal in the form of sheets or panels which may be brazed or otherwise fixedly secured to the supporting portions of the support frame, or may be formed of heavy wire or any other desired material.

Figure 2:
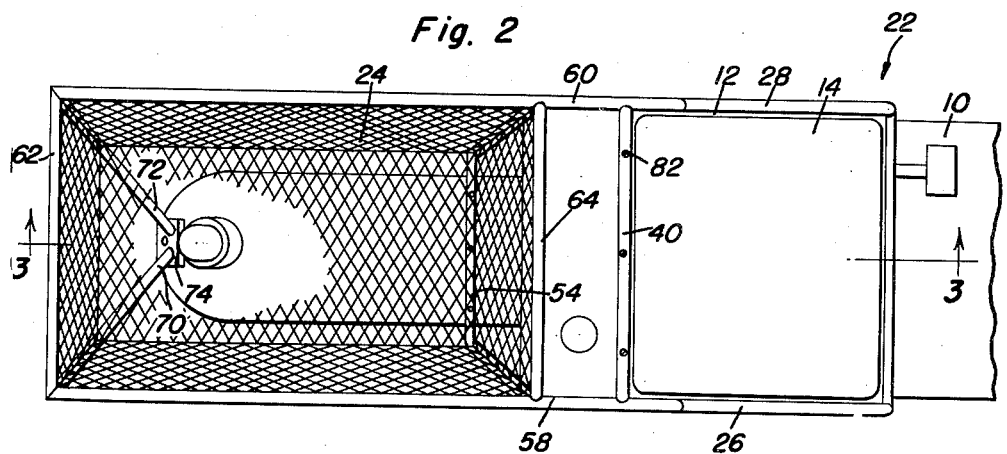
Figure 2 is a top plan view of the arrangement of Figure 1.

The device is adapted to be mounted upon a motorcycle of the Cushman motor scooter type in the following manner. The seat 14 is removed and by means of a strap 80 secured between the forward ends of the side members 26 and 28, and extended through suitable slits in the material of the bottom of the seat 14, the seat is fixedly secured to the supporting frame 22. The front mounting assembly of the supporting frame, with the seat attached thereto is now directly applied to the top or upper surface of the motor housing 12 and above the gas tank disposed within the upper portion of this housing, the parts being so proportioned that the forwardly extending side members 26 and 28 will closely embrace and receive therebetween the motor housing 12 as will be apparent from Figure 2. By means of suitable bolts 82 which extend through the above mentioned apertures 44 in the horizontally and laterally extending bars 40 and 42, the side members of the supporting frame are fixedly mounted upon the top surface of the motor housing 12.

In this position, the front bar 38 will be disposed against the front surface of the housing 12, and the depending legs 30, 32, 46 and 48 will embrace the opposite sides of the motor housing and will extend downwardly and rearwardly with respect to the same. The bifurcated ends 34, 36, 50 and 52 of these legs will be removably secured as by fastening bolts or the like 84 to the sides of the motor housing, while the curved rear bar 54 will extend rearwardly of the rear surface of the motor housing 12, and will rest upon and be removably secured to the upper surface of the rear fender 16 by fastening bolts 84 which extend through the apertures 56. Finally, the rear assembly is fixedly secured to the rear fender by means of removable bolts 86 which extend through the bracket 74 and attach the same to the rear fender.

When so positioned it will be apparent that the device is rigidly and yet removably attached to the motor scooter; and does not serve to increase the effective width of the scooter materially over the width of the motor housing 12.

It will be apparent that the device provides a very sturdy carriage by means of which a motor scooter with its known economies of operation, and low initial cost, may be readily adapted for use in delivering light articles as by stores or the like.

From the foregoing, the construction and operation of the invention will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A luggage carrier for motorcycles comprising a luggage holder, front and rear mounting assemblies, said luggage holder being supported at its front and rear ends by said mounting assemblies, said front assembly including depending legs adapted for engagement upon the sides of a motor housing of a motorcycle and means adapted for engagement with the seat of a motorcycle, between the seat and gas tank thereof, said front assembly including a lateral, rearwardly curved member adapted to be disposed rearwardly of a motor housing and to rest upon and be secured to the upper surface of a rear fender of a motorcycle, said rear assembly including a bracket adapted for attachment to the rear fender of a motorcycle, upwardly and outwardly extending legs engaging said bracket and said luggage holder.

2. A luggage carrier for motorcycles comprising a luggage holder, front and rear mounting assemblies, said luggage holder being supported at its front and rear ends by said mounting assemblies, said front assembly including depending legs adapted for engagement upon the sides of a motor housing of a motorcycle and means adapted for engagement with the seat of a motorcycle, between the seat and gas tank thereof, said front assembly including forwardly extending side members for embracing a motor housing therebetween, said legs being attached to said side members, said front assembly including a lateral, rearwardly curved member adapted to be disposed rearwardly of a motor housing and to rest upon and be secured to the upper surface of a rear fender of a motorcycle, upwardly and outwardly extending legs engaging the rear fender of the motorcycle and said luggage holder.

3. A luggage carrier for motorcycles comprising a luggage holder, front and rear mounting assemblies, said luggage holder being supported at its front and rear ends by said mounting assemblies, said front assembly including depending legs adapted for engagement upon the sides of a motor housing of a motorcycle and means adapted for engagement with the seat of a motorcycle, between the seat and gas tank thereof, said front assembly including forwardly extending side members for embracing a motor housing therebetween, said legs being attached to said side members, said front assembly including a lateral, rearwardly curved member adapted to be disposed rearwardly of a motor housing and to rest upon and be secured to the upper surface of a rear fender of a motorcycle, said rear assembly comprising a bracket adapted for attachment to the rear fender of a motorcycle, upwardly and outwardly extending legs engaging said bracket and said luggage holder.

4. A luggage carrier for motorcycles comprising a luggage holder, front and rear mounting assemblies, said luggage holder being supported at its front and rear ends by said mounting assemblies, said front assembly including depending legs adapted for engagement upon the sides of a motor housing of a motorcycle and means adapted for engagement with the seat of a motorcycle, said front assembly including forwardly extending side members for embracing a motor housing therebetween, said legs being attached to said side members, the lower ends of said legs being each bifurcated, said rear assembly comprising a bracket adapted for attachment to the rear fender of a motorcycle, upwardly and outwardly extending legs engaging said bracket and said luggage holder.

5. A luggage carrier for motorcycles comprising a luggage holder, front and rear mounting assemblies, said luggage holder being supported at its front and rear ends by said mounting assemblies, said front assembly including depending legs adapted for engagement upon the sides of a motor housing of a motorcycle, said front assembly including forwardly extending side members for embracing a motor housing therebetween, said legs being attached to said side members, a lateral bar between the forward portions of said side members for positioning forwardly of a motor housing, said rear assembly comprising a bracket adapted for attachment to the rear fender of a motorcycle, upwardly and outwardly extending legs engaging said bracket and said luggage holder.

MARTIN L. BROWN.

REFERENCES CITED

The following references are of record in the file of this patent:

UNITED STATES PATENTS

| Number | Name | Date |
|---|---|---|
| 297,238 | Dopp et al. | Apr. 22, 1884 |
| 403,406 | Abbott | May 14, 1889 |
| 1,382,942 | Van Hoose | June 28, 1921 |
| 2,109,315 | Harley | Feb. 22, 1938 |

FOREIGN PATENTS

| Number | Country | Date |
|---|---|---|
| 25,447 of 1911 | Great Britain | Nov. 15, 1911 |
| 112,076 | Great Britain | Dec. 27, 1917 |
| 425,531 | Great Britain | Mar. 15, 1935 |
| 620,221 | France | Jan. 15, 1927 |
| 218,557 | Switzerland | Aug. 17, 1942 |